US010367563B2

(12) United States Patent
Irie et al.

(10) Patent No.: US 10,367,563 B2
(45) Date of Patent: Jul. 30, 2019

(54) BASE STATION DEVICE, WIRELESS TERMINAL DEVICE, AND WIRELESS COMMUNICATION METHOD

(71) Applicant: Panasonic Intellectual Property Management Co., Ltd., Osaka (JP)

(72) Inventors: Masataka Irie, Kanagawa (JP); Naganori Shirakata, Kanagawa (JP); Hiroyuki Motozuka, Kanagawa (JP); Hiroshi Takahashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/940,687

(22) Filed: Mar. 29, 2018

(65) Prior Publication Data
US 2018/0219597 A1 Aug. 2, 2018

Related U.S. Application Data

(63) Continuation of application No. PCT/JP2016/004488, filed on Oct. 5, 2016.

(30) Foreign Application Priority Data

Nov. 5, 2015 (JP) ................................. 2015-217960

(51) Int. Cl.
H04B 7/06 (2006.01)
H04B 7/10 (2017.01)
(Continued)

(52) U.S. Cl.
CPC ......... *H04B 7/0617* (2013.01); *H04B 7/0408* (2013.01); *H04B 7/0619* (2013.01);
(Continued)

(58) Field of Classification Search
CPC .. H04B 7/0617; H04B 7/0408; H04B 7/0619; H04B 7/0639; H04B 7/088; H04B 7/10; H04L 1/0003; H04W 16/28; H04W 84/12
(Continued)

(56) References Cited

U.S. PATENT DOCUMENTS

2011/0316744 A1* 12/2011 Morioka ............. H04W 72/046
342/367
2016/0044711 A1* 2/2016 Lou ................... H04W 74/0816
370/338
2016/0255660 A1 9/2016 Son et al.

FOREIGN PATENT DOCUMENTS

WO 2010/099040 A1 9/2010
WO 2015/006537 A2 1/2015
WO 2015/069090 A1 5/2015

OTHER PUBLICATIONS

International Search Report of PCT application No. PCT/JP2016/004488 dated Dec. 27, 2016.
(Continued)

Primary Examiner — Michael R Neff
(74) Attorney, Agent, or Firm — Seed IP Law Group LLP

(57) ABSTRACT

A base station device includes a frame generator circuitry that generates a first training frame used for receive beam training among frames used for beamforming training, a beam controller circuitry that sets a beam used to transmit the first training frame to an omnidirectional mode, a transmitter circuitry that transmits the first training frame at the lowest MCS rate of IEEE 802.11, a receiver circuitry that receives first and second response frames from a wireless terminal device that has received the first training frame after a determined period since transmission of the first training frame, and a frame determiner circuitry that determines whether the first response frame is a response to the receive beam training. In a case where the first response
(Continued)

frame is a response to the receive beam training, the beam controller circuitry sets a beam received by the receiver circuitry to a directional beam, and the receiver circuitry receives the second response frame with a directional beam.

6 Claims, 16 Drawing Sheets

(51) Int. Cl.
    *H04W 16/28* (2009.01)
    *H04W 84/12* (2009.01)
    *H04B 7/0408* (2017.01)
    *H04L 1/00* (2006.01)
    *H04B 7/08* (2006.01)

(52) U.S. Cl.
    CPC ......... *H04B 7/0639* (2013.01); *H04B 7/0695* (2013.01); *H04B 7/088* (2013.01); *H04B 7/10* (2013.01); *H04L 1/0003* (2013.01); *H04W 16/28* (2013.01); *H04W 84/12* (2013.01)

(58) Field of Classification Search
    USPC .......................................................... 375/262
    See application file for complete search history.

(56) References Cited

OTHER PUBLICATIONS

IEEE 802.11(TM)-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE 802.11ad(TM)-2012, IEEE Standard for Information Technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Extended European Search Report, dated Oct. 22, 2018, for the related European Patent Application No. 16861763.7, 9 pages.

\* cited by examiner

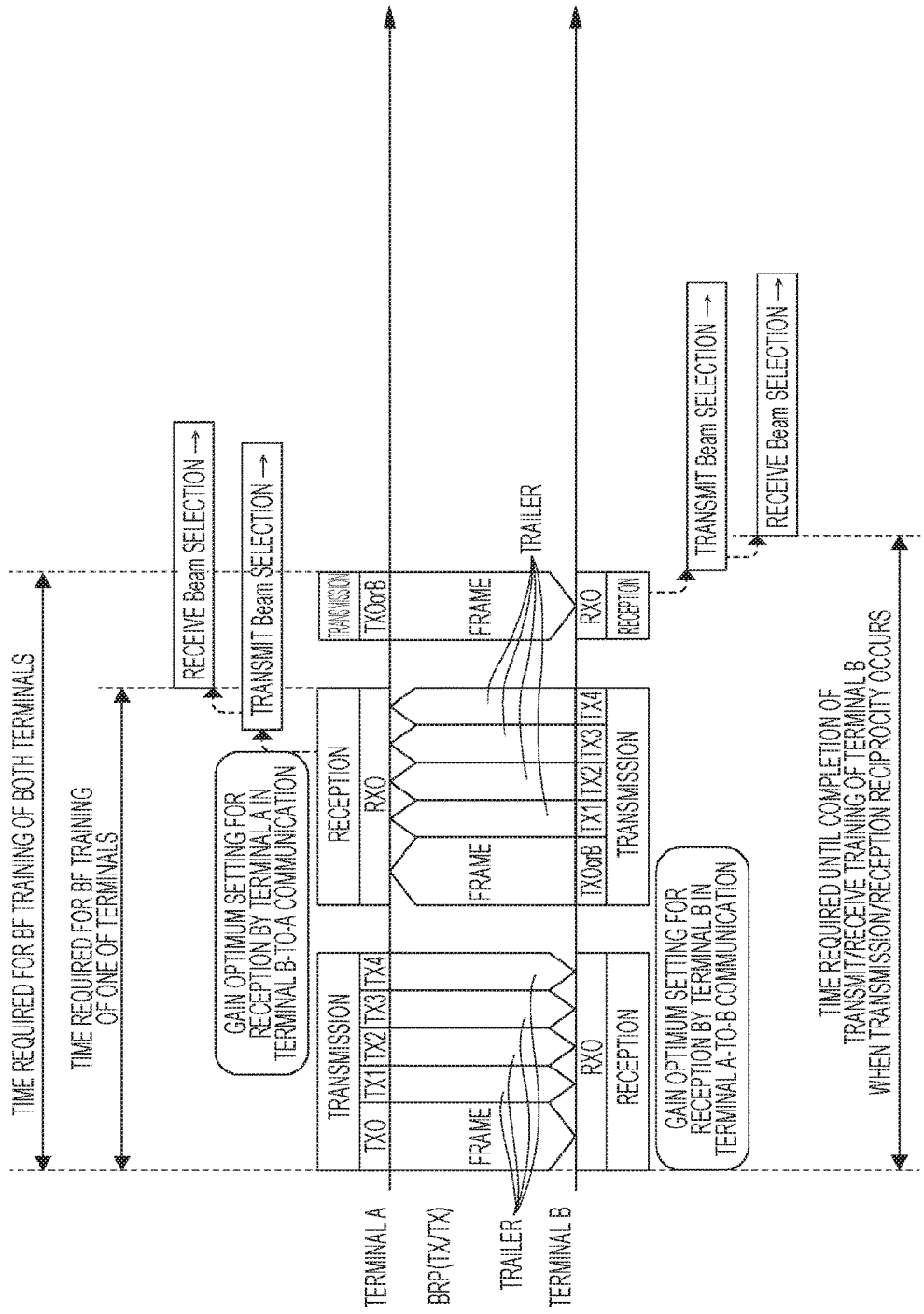

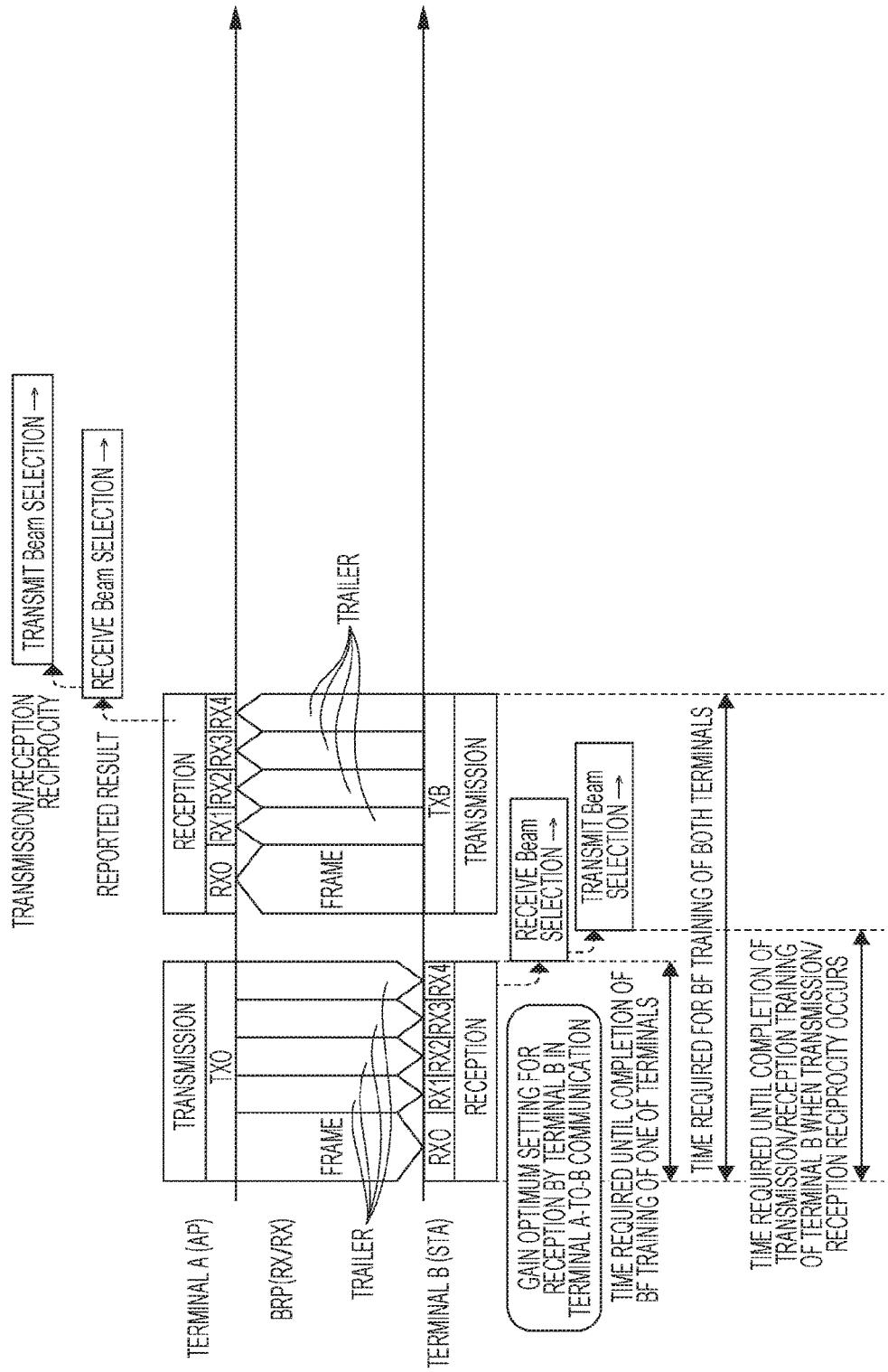

FIG. 5

| MCS INDEX | RECEIVE SENSITIVITY (dBm) |
|---|---|
| 0 | −78 |
| 1 | −68 |
| 2 | −66 |
| 3 | −65 |
| 4 | −64 |
| 5 | −62 |
| 6 | −63 |
| 7 | −62 |
| 8 | −61 |
| 9 | −59 |
| 10 | −55 |
| 11 | −54 |
| 12 | −53 |
| 13 | −66 |
| 14 | −64 |
| 15 | −63 |
| 16 | −62 |
| 17 | −60 |
| 18 | −58 |
| 19 | −56 |
| 20 | −54 |
| 21 | −53 |
| 22 | −51 |
| 23 | −49 |
| 24 | −47 |
| 25 | −64 |
| 26 | −60 |
| 27 | −57 |
| 28 | −57 |
| 29 | −57 |
| 30 | −57 |
| 31 | −57 |

BASE STATION DEVICE, WIRELESS TERMINAL DEVICE, AND WIRELESS COMMUNICATION METHOD

BACKGROUND

1. Technical Field

The present disclosure relates to a base station device, a wireless terminal device, and a wireless communication method that perform wireless communication compliant with IEEE802.11.

2. Description of the Related Art

As a system for providing high-speed wireless data communication, a wireless LAN (Local Area Network) system compliant with IEEE (The Institute of Electrical and Electronics Engineers, Inc.) 802.11 has been widely used. The wireless LAN systems compliant with IEEE 802.11 can be roughly classified into two types depending on the radio frequency.

One is a system used in microwave bands of 6 GHz or lower, such as IEEE 802.11a, b, g, n, and ac, which are called non-DMG. The other is a system used in the millimeter wave bands, such as IEEE 802.11ad, which is called DMG. DMG stands for Directional Multi Gigabit.

The DMG device used in the millimeter wave bands has a high degree of the rectilinearity of propagation of the radio waves to be used. Accordingly, the DMG device is expected to relieve pressure on effective bandwidth caused by interference by using techniques such as beamforming and spatial multiplexing and, thus, provide a high-speed wireless network having an effective throughput of 1 Gbps or higher.

SUMMARY

In wireless communication using the millimeter wave band like the DMG described above, in order to establish excellent communication, a series of operations to select a beam (a radio wave with high directivity) optimum for communication called "beamforming training" is performed before establishing connection.

However, there is a demand for reducing the time required for beamforming training, because beamforming training is not communication to transfer data actually used and affects the time from the start of connection to the start of data transfer.

For the beamforming training, IEEE 802.11ad defines a sector level sweep (SLS) protocol and a beam refinement protocol (BRP). Since BRP requires a shorter time for one beamforming training process than SLS, it is desirable to use BRP rather than SLS in order to reduce the time required for beamforming training.

In addition, by starting beamforming training from training of the transmit beam rather than training of the receive beam, the time required for beamforming training can be reduced. This is because in the receive beam training, the process of returning feedback from one wireless terminal device to the other wireless terminal device can be removed. In addition, this is because in the case where the beam in the wireless terminal device on the responder side has the transmission/reception reciprocity, both transmit beam training and receive beam training are completed during one round trip.

However, to enable connection with a wireless terminal device for low-rate communication, the IEEE 802.11 standard does not cover the process in which a base station device starts beamforming training from the BRP and starts training from receive beamforming training. However, when high-rate communication is performed after connection is established, the base station device only needs to connect with a wireless terminal device capable of high-rate communication, so that beamforming training need not be restricted by the above-described rule.

Accordingly, when high-rate communication is performed, it is desirable that the possibility of connection with a wireless terminal device for low-rate communication be eliminated in advance. One non-limiting and exemplary embodiment facilitates providing a base station device, a wireless terminal device, and a wireless communication method capable of eliminating, in advance, connection with a wireless terminal device for low-rate communication when high-rate communication is performed after connection is established and reducing the time required for beamforming training in a wireless communication system compliant with IEEE 802.11.

In one general aspect, the techniques disclosed here feature a base station device including frame generation circuitry that generates a first training frame used for receive beam training among frames used for beamforming training, beam controlling circuitry that sets a beam used to transmit the first training frame to an omnidirectional beam, transmission circuitry that transmits the first training frame at the lowest MCS rate defined in IEEE 802.11, reception circuitry that receives a first response frame and a second response frame from a wireless terminal device that has received the first training frame after a determined period since transmission of the first training frame, and frame determination circuitry that determines whether the received first response frame is a response to the receive beam training. In a case where the received first response frame is a response to the receive beam training, the beam controlling circuitry sets a beam received by the receiving unit to a directional beam, and the reception circuitry receives the second response frame by using the directional beam.

According to the present disclosure, in a wireless communication system compliant with IEEE 802.11, connection with a wireless terminal device for low-rate communication can be excluded in advance, and the time required for beamforming training can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4A is a sequence diagram illustrating the time required for transmit beam training using BRP;

FIG. 4B is a sequence diagram illustrating the time required for receive beam training using BRP;

FIG. 5 illustrates a correspondence between MCS and receive sensitivity;

DETAILED DESCRIPTION

Underlying Knowledge Forming Basis of the Present Disclosure

As described above, in IEEE802.11ad-2012, SLS (Sector Level Sweep) and BRP (Beam Refinement Protocol) are defined as the beamforming training procedure. The SLS and BRP procedures are briefly described below.

Figure 1:
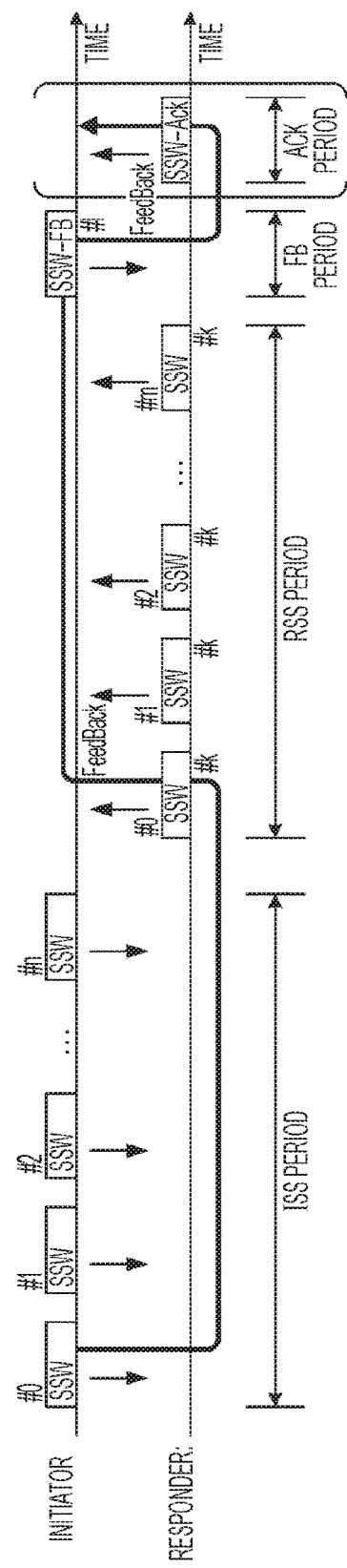
FIG. 1 illustrates an example of a beamforming sequence by SLS.

SLS is described first. FIG. 1 illustrates an example of a beamforming sequence by SLS. In FIG. 1, an initiator is a wireless communication device that starts training, and a responder is a wireless communication device that performs training in response to the start of training. Either a base station device or a wireless terminal device can serve as the initiator or the responder.

Transmit beam training of the initiator and transmit beam training of the responder are described first. In an ISS (Initiator Sector Sweep) period, which is the sweep period of the Initiator, the Initiator transmits a plurality of SSW (Sector SWeep) frames by sweeping the beam first. Each of the SSW frames includes information about the beam swept by the wireless communication device that performs transmission, that is, the ID of the beam. As illustrated in FIG. 1, the beam ID of the SSW frame transmitted by the initiator is in the range of #0 to #n, and the (n+1) SSW frames are transmitted in total from the initiator.

The responder receives some of the plurality of SSW frames transmitted from the initiator. The responder stores the beam ID (for example, #k) of the SSW frame for which the best reception has been performed among the received SSW frames. The ISS period ends at this point in time.

Subsequently, during the RSS (Responder Sector Sweep) period, which is the sweep period of the responder, the responder sweeps the beam and transmits a plurality of SSW frames including the beam ID (for example, #k) stored in the ISS period. Each of the SSW frames contains a beam ID that differs from that of the SSW frame transmitted by the initiator. As illustrated in FIG. 1, the beam IDs of the SSW frames transmitted by the responder are in the range of #0 to #m, and (m+1) SSW frames are transmitted in total from the responder.

The initiator receives some of the plurality of SSW frames sent from the responder. The Initiator refers to the received SSW frame and get to know that the SSW frame #k was the best among the SSW frames transmitted by the initiator. Thereafter, the initiator stores the beam ID (for example, #l) of the SSW frame for which the best reception has been performed among the SSW frames received from the responder. The RSS period end at this point in time.

Subsequently, an FB (Feed Back) period occurs. In the FB periods, the initiator sends feedback to the responder to let the responder to know which one of the SSW frames transmitted by the responder was the best. In the FB period, the initiator transmits an SSW-FB frame indicating that the SSW frame #l was the best among the SSW frames received from the responder. The responder receives the SSW-FB frame and gets to know that the SSW frame #l was the best.

The FB period may be followed by an ACK period. In the ACK period, an SSW-ACK frame is transmitted to the initiator to let the initiator to know that the responder knows the best SSW frame.

The case of receive beam training of the initiator and transmit beam training of the responder is described below. During the ISS period, the initiator transmits a plurality of SSW frames with the beam kept constant. The responder sequentially sweeps the receive beam and receives the SSW frame. Thereafter, the responder stores the ID of the receive beam that has yielded the best reception quality.

Subsequently, during the RSS period, the responder transmits a plurality of SSW frames with the beam kept constant. The initiator sequentially sweeps the receive beam and receives the SSW frames. The Initiator stores the ID of the receive beam that has yielded the best reception quality.

Furthermore, during the FB period, the initiator transmits an SSW-FB frame, and the responder receives the SSW-FB frame. In this manner, the responder gets to know which one of the SSW frames was the best for the Initiator. The FB period may be followed by an ACK period during which the Responder transmits, to the Initiator, an SSW-ACK frame notifying that the responder knows the best SSW frame.

Figure 2:
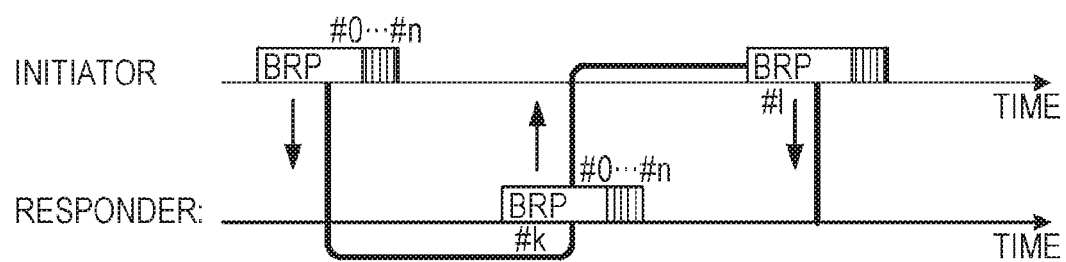
FIG. 2 illustrates an example of a beamforming sequence by BRP.

The procedure for SLS has been described above. The BRP (Beam Refinement Protocol) is briefly described below. FIG. 2 illustrates an example of a beamforming sequence by BRP. The procedure for BRP is almost the same as the procedure for SLS. The difference is that a beam is not switched on a frame-by-frame basis, but switching (sweep) of a beam is made on the basis of a trailer (Trailer) appended to the rear end of the frame. Note that the trailer includes the AGC field and the TRN-R/T field in the PHY layer. The AGC (Automatic Gain Control) field is a field related to automatic gain control, and the TRN-R/T field is a field related to training. Note that -R/T means -R or -T, where R represents reception (RX), and T represents transmission (TX).

In IEEE 802.11ad-2012, BRP is used for a training for fine adjustment which is additionally performed with SLS. This is because BRP training is carried out after establishing connection (a link) between the wireless communication devices to some extent by using SLS.

Figure 3A:
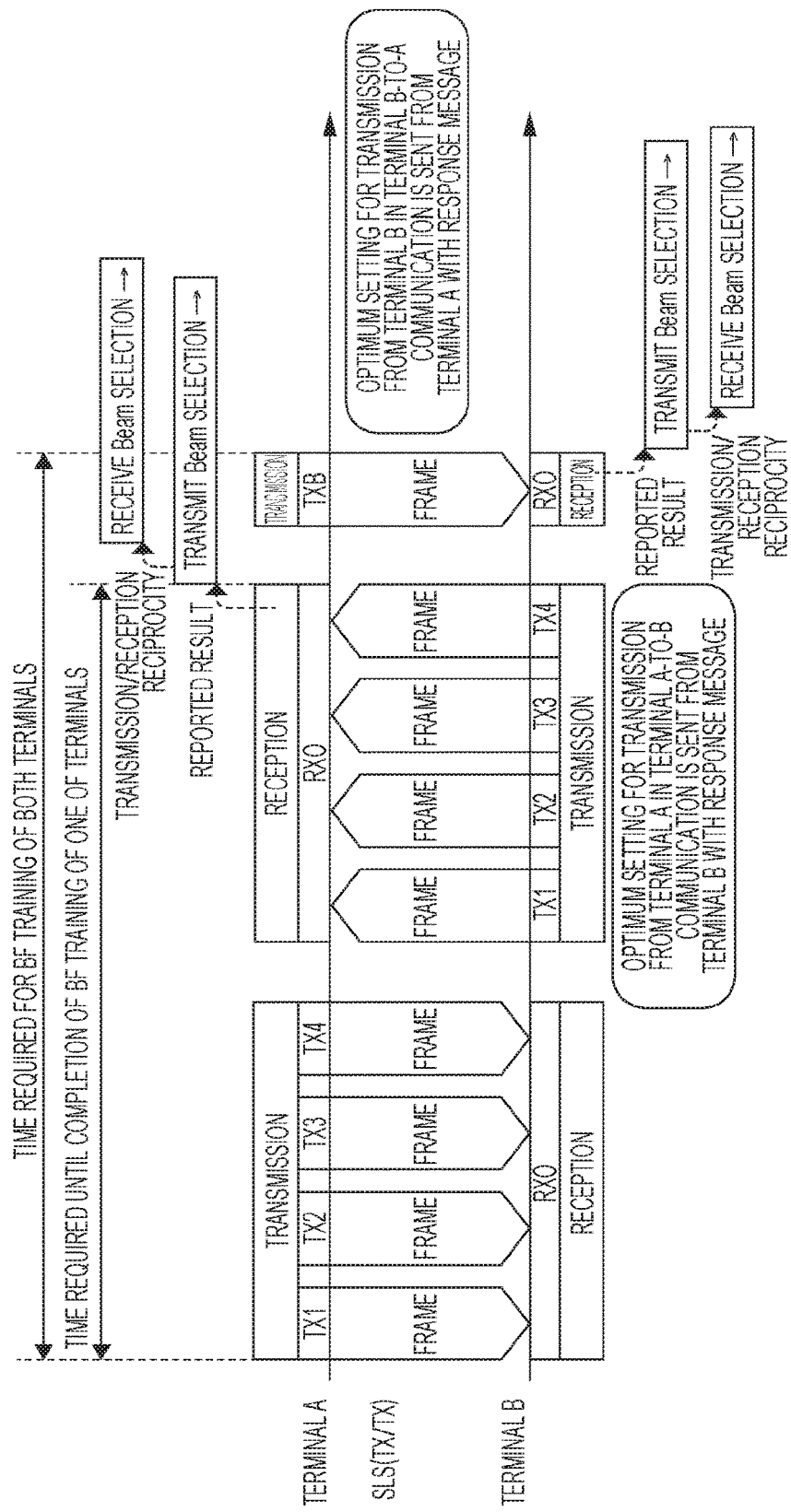
FIG. 3A is a sequence diagram illustrating the time required for transmit beam training using SLS.
Figure 3B:
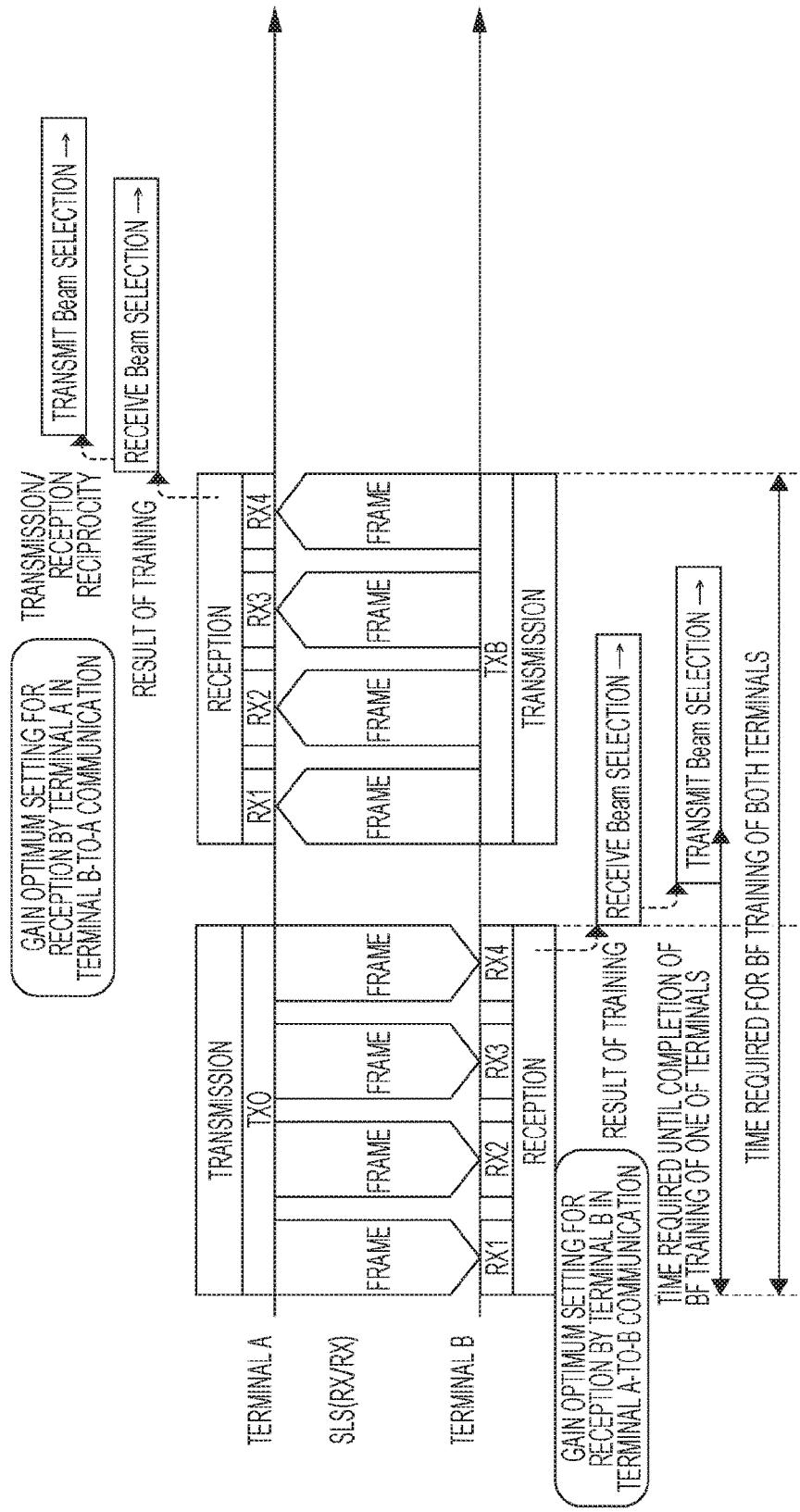
FIG. 3B is a sequence diagram illustrating the time required for receive beam training using SLS.

Subsequently, the times required for various beamforming training processes, that is, the times from the start to end of beamforming training processes are compared with one another. FIG. 3A is a sequence diagram illustrating the time required for transmit beam training using SLS. In addition, FIG. 3B is a sequence diagram illustrating the time required for receive beam training using SLS. FIG. 4A is a sequence diagram illustrating the time required for transmit beam training using BRP. FIG. 4B is a sequence diagram illustrating the time required for receive beam training using BRP.

In FIG. 3A, a frame is transmitted by four sweeps. In FIG. 3B, a frame is received by four sweeps. The time required for transmission or reception of one frame is, for example, 20 microseconds, and the interval between frames is, for example, 1 microsecond. When one frame is transmitting by four sweeps, at least 83 microseconds are required for one transmission or reception.

In FIG. 4A, after a frame is transmitted, four trailers are swept and transmitted. In FIG. 4B, after a frame is received, four trailers are swept and received. The time required for transmitting one trailer is, for example, 2 microseconds. In this case, 28 microseconds are required for one transmission or reception.

Here, as can be seen from comparison of the time required for the transmit beam training using SLS illustrated in FIG. 3A and the time required for the transmit beam training using BRP illustrated in FIG. 4A, the time required for one transmission/reception using BRP is shorter than that using SLS. Accordingly, to reduce the time required for beamforming training, it is desirable to perform beamforming training using BRP.

In addition, as can be seen from comparison of the time required for the transmit beam training using BRP illustrated in FIG. 4A and the time required for receive beam training using the BRP illustrated in FIG. 4B, the beam training using the receive beam illustrated in FIG. 4B does not include a step of returning feedback from one terminal to the other terminal and, thus, requires a shorter time. In addition, when there is transmission/reception reciprocity in the beam of the wireless terminal device which serves as a responder (a terminal B illustrated in FIGS. 4A and 4B), both beamforming training of the initiator and beamforming training of the responder are completed when transmission from the Initiator to the Responder is completed. Consequently, the time required for the receive beam training is less than half the time required for the transmit beam training.

Transmission/reception reciprocity is the reciprocity that occurs between a transmit beam pattern and a receive beam pattern by implementation. When the transmission/reception reciprocity occurs and if the best beam is determined for either transmission process or reception process, the result is reflected on the other process (the result of transmission is reflected on reception, and vice versa) and can be applied to the subsequent communication.

As can be seen from the description above, to complete beamforming training in a short time, it is desirable to perform beamforming training using BRP and, in addition, the receive beam training is more desirable than the transmit beam training. However, according to IEEE 802.11, starting beamforming training from beamforming training using BRP and starting beamforming training from receive beam training are non-standard, because a base station device needs to connect a wireless terminal device for low-rate communication. However, if high-rate communication is needed after connection is established, it is desirable not to connect with a wireless terminal device for low-rate communication. In view of such circumstances, the wireless communication device according to the present disclosure can eliminate the connection with a wireless terminal device for low-rate communication in advance when high-rate communication is performed after connection, and the time required for beamforming training can be reduced.

DESCRIPTION OF PREMISES OF THE PRESENT DISCLOSURE

Wireless Modulation Scheme

IEEE 802.11 supports multiple MCS (Modulation and Coding Scheme) as a modulation scheme. The MCS is an index assigned to each of modulation schemes of a plurality of data rates. FIG. 5 illustrates the correspondence between MCS and the receive sensitivity. The rate decreases with decreasing index number, and the rate increases with increasing index number. As illustrated in FIG. 5, the MCS index to be set is in the range of 0 to 31. Note that, for example, MCS 0 to MCS 9 are the MCSs that are frequency used.

As illustrated in FIG. 5, the difference in receive sensitivity between MCS 0 and MCS 1 (10 dBm) is set so as to be larger than a difference in the receive sensitivity between every other adjacent indexes (about 1 or 2 dBm in MCS 1 to MCS 9). That is, MCS 0 has a lower rate than the other MCSs. According to IEEE 802.11, MCS 0 is used for control purposes, that is, for example, Beacon (information about the wireless communication device itself output for communication with other wireless communication devices) element and beamforming training. According to the present embodiment, the above-mentioned "low rate" indicates MCS 0, for example. The above-mentioned "high rate" indicates MCS 9, for example.

Configuration of Network

For example, IEEE 802.11 provides the following communication modes: IBSS (Independent Basic Service Set), BSS (Basic Service Set), and PBSS (Personal Basic Service Set) as network configurations. IBSS is called an ad hoc mode, and BSS is called an infrastructure mode. In BSS and PBSS among them, AP (Access Point) and PCP (PBSS Control Point) are defined as wireless communication devices corresponding to the base station devices that manage the connection, respectively. Hereinafter, these are collectively referred to as PCP/AP. In addition, non-AP STA (STAtion) and non-PCP STA are defined as wireless communication devices each corresponding to a wireless terminal device connected to the base station device. Hereinafter, these wireless communication devices corresponding to the wireless terminal devices are collectively referred to as non-PCP/AP STA.

Embodiment of the Present Disclosure

Figure 6:
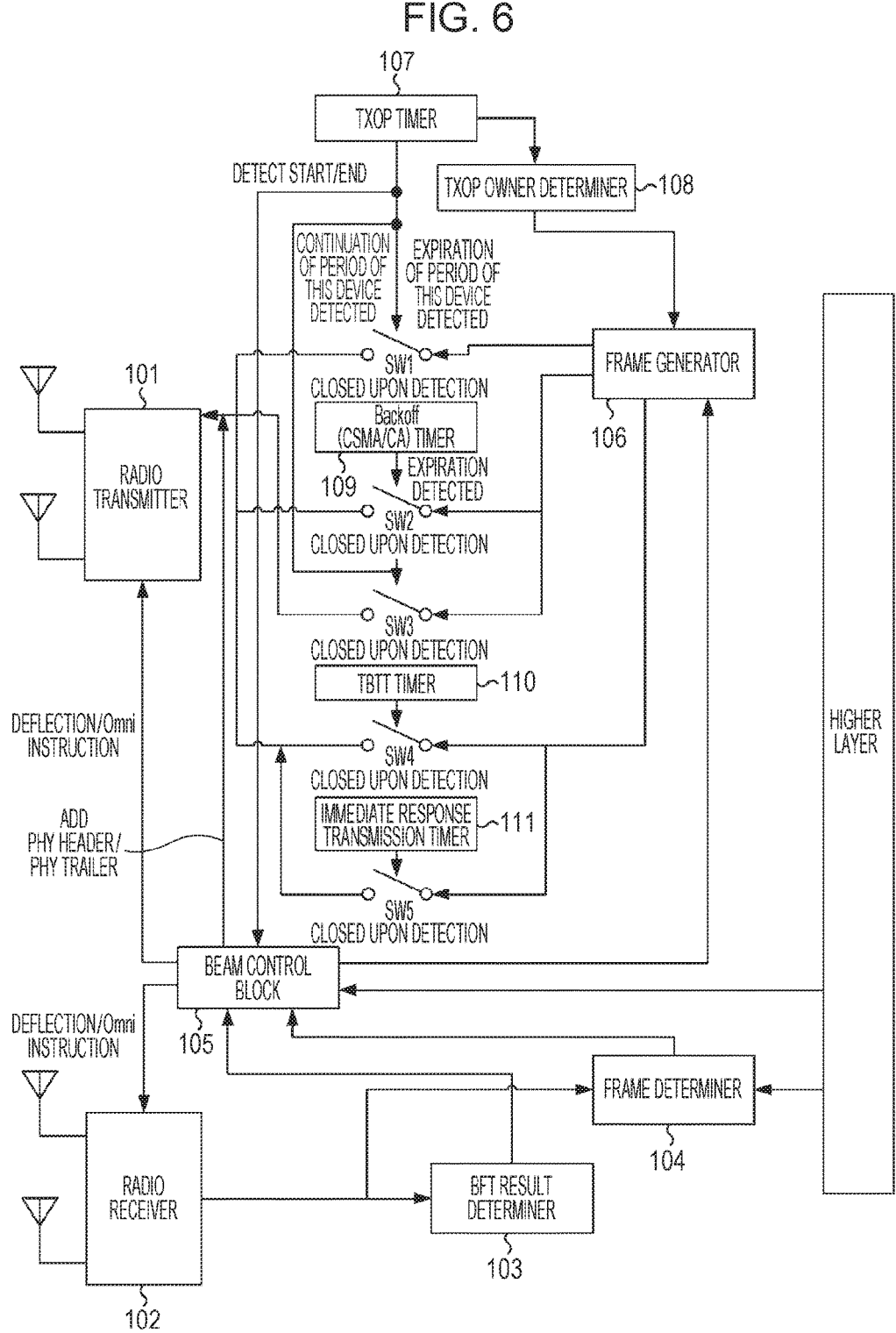
FIG. 6 is a block diagram illustrating an example of the configuration of an access point AP.

In light of the background described above, embodiments of the present disclosure are described below. The configuration of an access point AP is described first as an example of a base station device (PCP/AP). FIG. 6 is a block diagram of an example of the configuration of the access point AP.

FIG. 6 is a block diagram of an example of the configuration of the access point AP. As illustrated in FIG. 6, the AP includes a radio transmitter 101, a radio receiver 102, a BFT (BeamForming Training) result determiner 103, a frame determiner 104, a beam control block 105, a frame generator 106, a TXOP timer 107, a TXOP owner determiner 108, a Backoff (CSMA/CA) timer 109, a TBTT timer 110, and an immediate response transmission timer 111. Among the configurations described as the configurations of the AP, the configurations other than the radio transmitter 101 and the radio receiver 102 are the configurations in the MAC (Media Access Control) layer.

The radio transmitter 101 and the radio receiver 102 perform transmission and reception of frames with another wireless communication device (for example, STA). Each of the radio transmitter 101 and the radio receiver 102 has at least one antenna and a beam deflection function and, thus, can change the direction of the beam. The radio transmitter 101 and the radio receiver 102 perform beam sweeping and carry out beamforming training under the control of a beam control block 105 described below.

The BFT result determiner 103 determines the result of beamforming training carried out together with another base station device. More specifically, the BFT result determiner 103 determines, for example, which one of the beams was optimal as a result of the receive beam training and outputs the determination result to the beam control block 105.

The information in a frame sent from another wireless communication device and received by the radio receiver 102 is determined by the frame determiner 104. If the information in the frame received from another wireless communication device is a receive beam training request from the wireless communication device, the frame determiner 104 outputs the information to the beam control block 105 (described below).

The beam control block 105 performs beam control for the radio transmitter 101 and the radio receiver 102. The beam control block 105 performs beam control for the radio transmitter 101 and the radio receiver 102 on the basis of the result of beamforming training output from the BFT result determiner 103, the presence/absence of the beamforming training request output from the frame determiner 104, and the setting information received from a higher layer (a layer higher than the network layer). Note that the term "beam control" refers to controlling the beams of the radio transmitter 101 and the radio receiver 102 to a "directional" beam or "omni" and "quasi-omni" beams.

In addition, the beam control block 105 outputs, to the frame generator 106, an instruction to generate a frame including content indicating receive beam training and outputs an instruction to add a PHY (physical) header and/or a PHY trailer to a MAC frame output from the frame generator 106.

The frame generator 106 generates a frame to be transmitted to another wireless communication device. According to the present embodiment, the type of frame to be transmitted is not limited to any particular type. When receiving, from the beam control block 105, an instruction to generate a frame including content indicating receive beam training, the frame generator 106 generates a MAC frame such that the MAC frame includes content that indicates receive beam training.

The TXOP timer 107 is a timer for measuring the time period of the TXOP and notifying the start and end of the TXOP. The term "TXOP (Transmission OPportunity)" refers to a time period during which the wireless communication device occupies the communication channel. According to the present disclosure, the method for determining the start of the TXOP by the TXOP timer 107 is not limited to any particular method.

When the TXOP timer 107 determines that the TXOP period or the transmission inhibition period has started, the TXOP owner determiner 108 determines the wireless communication device (the owner) that acquired the TXOP. That is, the TXOP owner determiner 108 determines whether the wireless communication device currently being discussed has acquired the TXOP or another wireless communication device has acquired the TXOP. According to the present disclosure, the method employed by the TXOP owner determiner 108 for identifying the wireless communication device that acquired the TXOP is not limited to any particular method.

In addition, after the start of the TXOP period of the wireless communication device including the TXOP owner determiner 108 or another wireless communication device, the TXOP timer 107 and the TXOP owner determiner 108 determine whether the TXOP period has ended. If it is determined that the TXOP has ended, a switch SW1 is closed, and a MAC frame generated by the frame generator 106 is output to the radio transmitter 101, which transmits the MAC frame to the surroundings. Note that the frame generator 106 adds a PHY (physical) header and/or a PHY trailer to the MAC frame. The PHY trailer is a trailer for beamforming training. However, if it is determined that the TXOP period is in progress, the switch SW3 is closed.

The Backoff (CSMA/CA) timer 109 is a timer that measures backoff (the time needed to avoid frame collision). Note that CSMA/CA stands for Carrier Sense Multiple Access with Collision Avoidance. CSMA/CA is adopted by IEEE 802.11 as a communication procedure. If the backoff timer 109 determines that the backoff time has ended, the switch SW2 is closed and, thereafter, the MAC frame generated by the frame generator 106 is transmitted from the radio transmitter 101 to the wireless communication devices located around.

The TBTT timer 110 determines whether the transmission period of the Beacon frame has been reached. A Beacon frame is a frame including information regarding an AP used by another wireless communication device to start connection with the wireless communication device (AP) currently being discussed. If it is determined that the transmission period of the Beacon frame has been reached, the switch SW4 is closed, and the Beacon frame is transmitted from the radio transmitter 101 to the wireless communication devices located around.

When an ACK frame is transmitted after a Data frame is received, the immediate response transmission timer 111 is started after the Data frame is received. Alternatively, when a CTS frame is transmitted after an RTS frame is received, the immediate response transmission timer 111 is started after the RTS frame is received. Thereafter, it is determined that a determined time period has expired, the switch SW5 is closed, and an immediate response frame, such as the ACK frame or the CTS frame generated by the frame generator 104, is transmitted from the radio transmitter 101 to the wireless communication devices located around.

Non-PCP/AP STA

Figure 7:
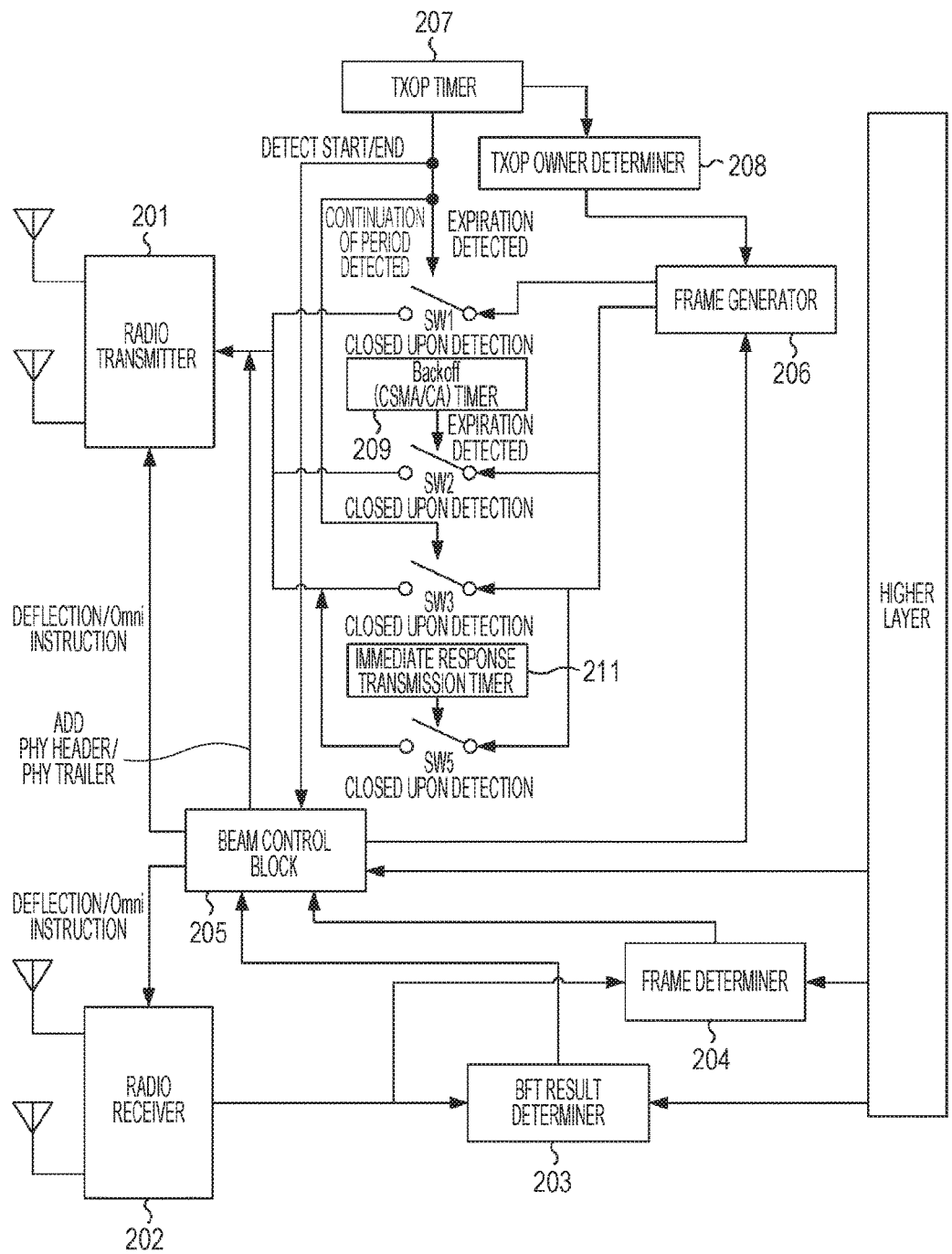
FIG. 7 illustrates an example of the configuration of an STA.

Subsequently, FIG. 7 illustrates an example of the configuration of an STA, which is an example of a non-PCP/AP STA. Note that the non-PCP/AP STA corresponds to the wireless terminal device according to the present disclosure. That is, the STA illustrated in FIG. 7 is an example of the wireless terminal device according to the present disclosure. As illustrated in FIG. 7, the STA includes a radio transmitter 201, a radio receiver 202, a BFT result determiner 203, a frame determiner 204, a beam control block 205, a frame generator 206, a TXOP timer 207, a TXOP owner determiner 208, a Backoff (CSMA/CA) timer 209, and an immediate response transmission timer 211.

The radio transmitter 201, the radio receiver 202, the TXOP timer 207, the Backoff timer 209, and the immediate response transmission timer 211 operate in substantially the same manner as the configurations having the same names in the AP described with reference to FIG. 6. Accordingly, descriptions of the radio transmitter 201, the radio receiver 202, the TXOP timer 207, the Backoff timer 209, and the immediate response transmission timer 211 are not repeated.

The frame determiner 204 determines the information contained in a frame received by the radio receiver 202 from another wireless communication device and, in particular, an AP serving as a base station device. More specifically, the information contained in the frame is Beacon information from the AP and the receive beam training request from the AP, and the like. Note that when the Beacon information from an AP is contained in the frame, the frame determiner 204 obtains, from the higher layer, a list of APs that desire to connect themselves to this STA (if there are a plurality of APs that desire to connect themselves to this STA) and compares the information regarding each of the APs in the list with the information regarding the AP obtained on the basis of the Beacon information. Thereafter, the frame determiner 204 outputs, to the beam control block 205, the result of comparison and the receive beam training request from the AP.

The beam control block 205 performs beam control for the radio transmitter 201 and the radio receiver 202. The beam control block 205 performs the beam control for the radio transmitter 201 and the radio receiver 202 on the basis of the result of the beamforming training output from the BFT result determiner 203, the presence/absence of a beamforming training request output from the frame determiner 204, and the setting information from a higher layer (a layer higher than or equal to the network layer). Note that the term "beam control" refers to controlling the beams of the radio transmitter 201 and the radio receiver 202 to a "directional" beam or "omni" and "quasi-omni" beams.

In addition, the beam control block 205 outputs, to the frame generator 206, an instruction to generate a frame including content indicating receive beam training and outputs an instruction to add a PHY (physical) header and/or a PHY trailer to the MAC frame output from the frame generator 206. The PHY trailer is a trailer for beamforming training.

The frame generator 206 generates a frame to be transmitted to another wireless communication device. The type of frame to be transmitted is not limited to any particular type. When receiving, from the beam control block 205, an instruction to generate a frame including content indicating receive beam training, the frame generator 206 generates a MAC frame such that the MAC frame includes content that indicates receive beam training.

Process Flow

Figure 8:
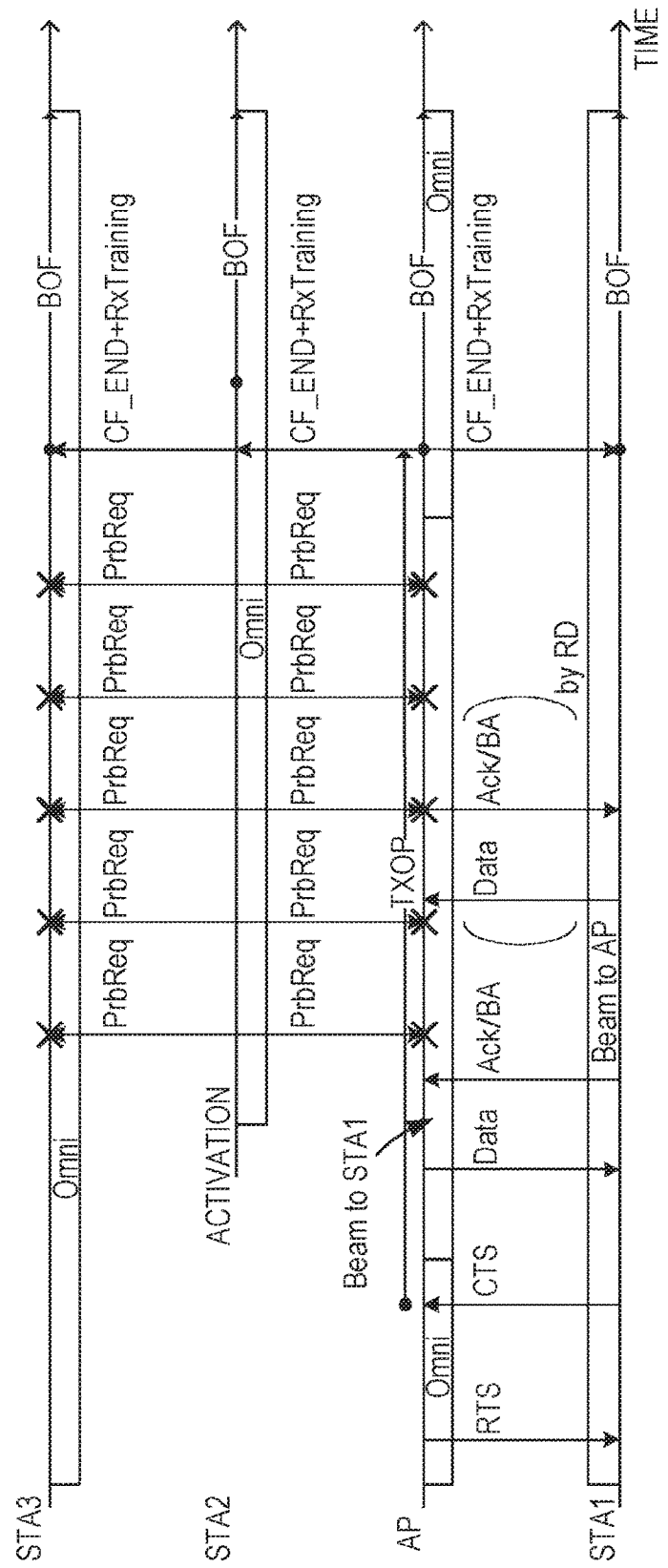
FIG. 8 is a sequence diagram illustrating the flow of processing performed by a wireless communication system according to an embodiment of the present disclosure.

FIG. 8 is a sequence diagram illustrating the flow of processing performed by the wireless communication system according to the present embodiment. In FIG. 8, the sequence of communication between one of APs and a plurality of STAs is described in detail as an example of the wireless communication system according to the present embodiment.

In the communication sequence illustrated in FIG. 8, the STA 2 is activated during communication between the AP and the STA 1, and the STA 2 starts scanning (searching for a connection destination). In the communication sequence illustrated in FIG. 8, the communication between the AP and the STA 1 is activated by the AP.

The AP performs a backoff procedure (arbitration by Coordination function) in accordance with CSMA/CA first. The backoff procedure is performed to prevent collision of frames due to communication performed by a plurality of wireless communication devices at substantially the same time. Upon completion of the backoff procedure, the AP transmits, to the STA 1, an RTS (Request to Send) frame in which the destination address is set to STA 1 so as to start the communication illustrated in FIG. 8. To improve the reachability, the RTS frame is transmitted by using a modulation scheme set to a low rate (data communication speed), such as MCS 0.

After receiving the RTS frame destined for the STA 1 (this wireless communication device), the STA 1 responds with a CTS (Clear to Send) frame. After receiving the CTS frame from the STA 1, the AP acquires a transmission opportunity TXOP (Transmission OPportunity) over a determined period of time.

The AP gets to know that the transmission opportunity has been acquired for a determined period since the time of reception by receiving the CTS frame from the STA 1 and directs the transmit and receive beams toward the STA 1 to perform better communication (to improve the communication quality). In addition, after transmitting the RTS frame and before receiving the CTS, the beams may be directed to the STA 1 to more reliably receive the CTS frame.

The AP continues to transmit the frames during the acquired TXOP period. During the period acquired by the AP, the STA 1 transmits and receives data and transmits an arrival confirmation response message by using an ACK (Acknowledge) frame or BA (Block Ack) frame as needed. Note that during the TXOP period acquired by the AP, the AP may temporarily transfer the data transmission opportunity to the STA 1 by using a function such as RD (Reverse Direction), and the STA 1 may perform communication.

While the AP is communicating with the STA 1, the STA 2 is activated and sends, to the wireless communication devices located around, a Probe Request frame (PrbReq) used for link setup. However, the AP that is to receive the PrbReq frame and respond to the frame is transmitting and receiving a directional beam to and from the STA 1. Thus, it is difficult to receive the beam from the STA 2. Therefore, the STA 2 searches for a connection partner and repeatedly transmits the PrbReq frame.

If the TXOP period expires or if the TXOP becomes unnecessary (for example, there is nothing to transmit) during the TXOP period, the AP declares release of the TXOP and notifies the STAs located around of release of the TXOP by transmitting a CF-END frame. The CF-END frame is a frame used to notify the wireless communication devices located around of the end of the TXOP. Note that the CF-END frame to be transmitted by the AP has a trailer added thereto for receive beam training.

More specifically, the transmitted CF-END frame corresponds to the receive training portion (a first half portion) illustrated in FIG. 4B. The frame illustrated in FIG. 4B corresponds to the CF-END frame, and the trailer portion corresponds to the trailer for receive beam training. At the end of the TXOP, the AP adds a trailer for receive beam training to the CF-END frame and transmits it to the wireless communication devices located around. In this manner, connection with a wireless communication device for low-rate communication can be avoided, and beamforming training with the wireless communication device to be connected next can be carried out in a short time.

Example of Operations Performed by AP and STA

An example of the operations performed by the AP and the STA is described in more detail. For convenience of description, an example of the operation performed by the STA is described first. In the following example of the operation, reciprocity is established between the beams transmitted and received by the AP and STA.

Figure 9:
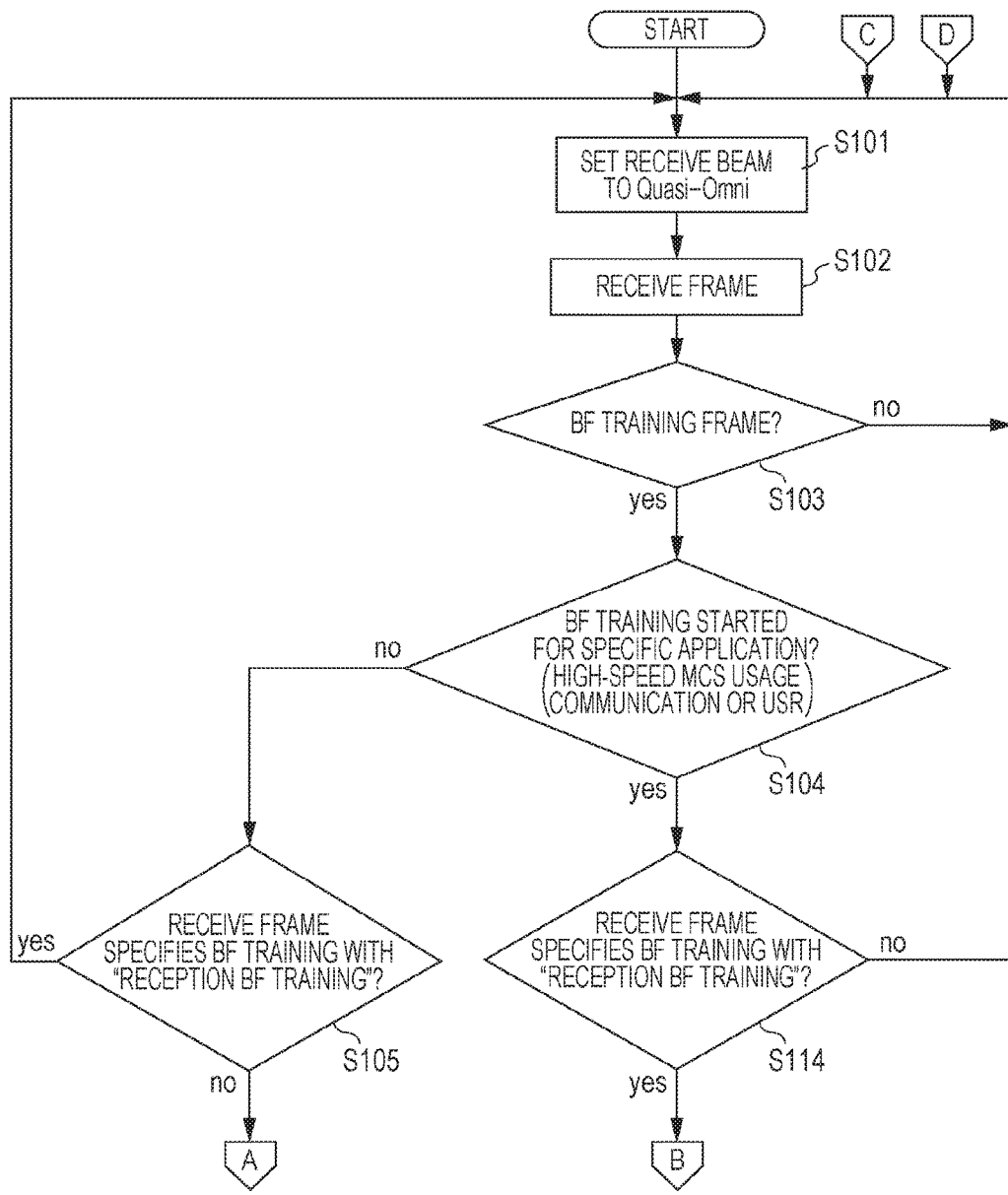
FIG. 9 is a flowchart illustrating an example of the operation performed at the STA side when performing initial connection (link setup) with an AP.
Figure 10:
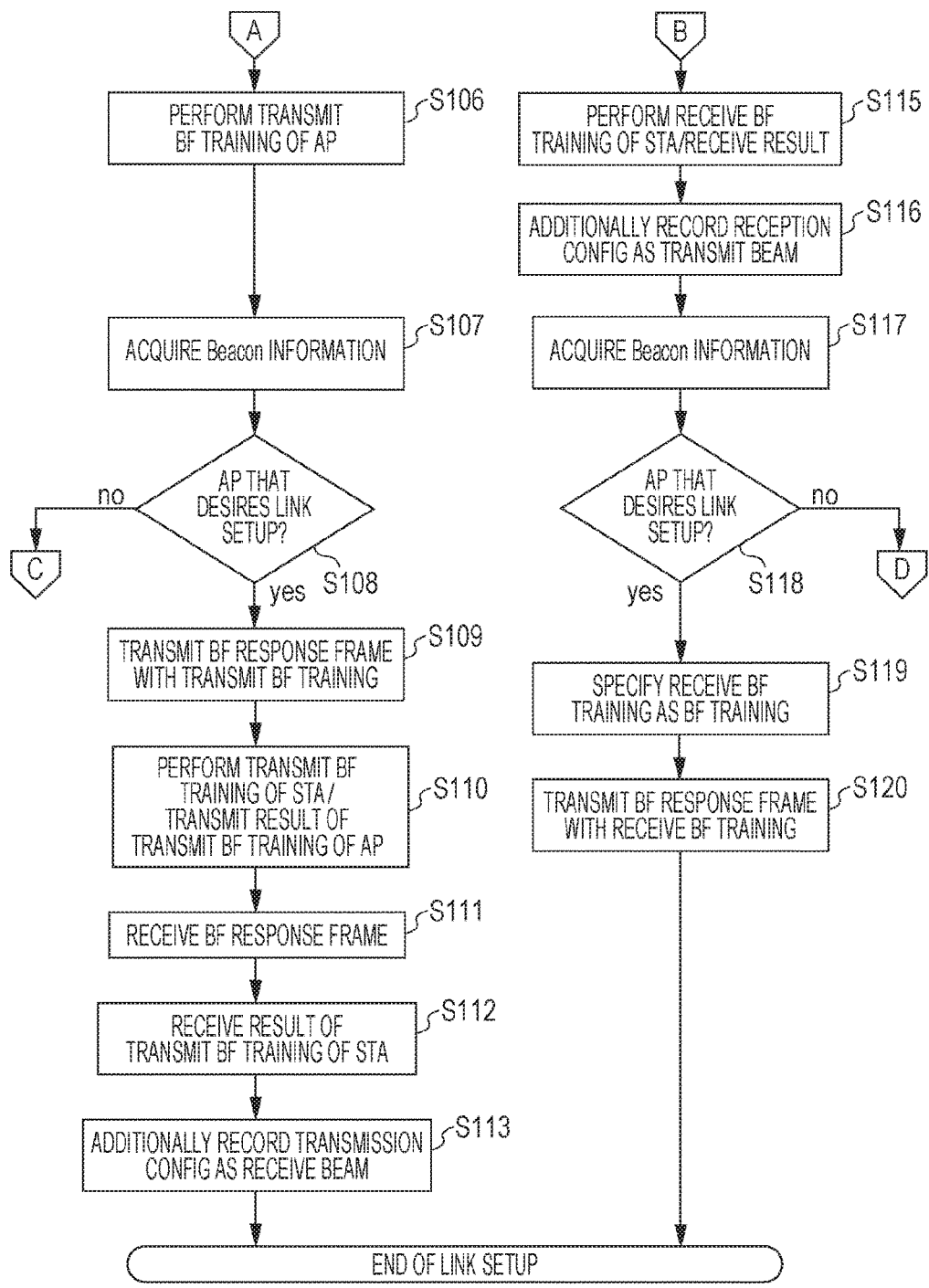
FIG. 10 is a flowchart illustrating an example of the operation performed at the STA side at the time of initial connection (link setup) with the AP.

FIGS. 9 and 10 are flowcharts illustrating an example of the operation performed by the STA at the time of initial connection (link setup) with the AP. Note that in FIGS. 9 and 10, the STA has not yet undergone initial connection (link setup) with the AP.

In step S101, the STA sets the receive beam to "quasi-omni". Thereafter, in step S102, the STA receives some frame from another wireless communication device (hereinafter referred to as AP, for example). In step S103, the STA determines whether the frame received in step S102 is a frame for beamforming training. If it is determined that the frame is a frame for beamforming training (step S103, yes), the processing proceeds to step S104. Otherwise (step S103, no), the processing returns to step S101.

In step S104, the STA determines whether the beamforming training is started for a specific application, for example, communication using high-speed MCS or USR (Ultra Short Range: in this example, non-contact high speed transmission in the millimeter wave band). If the STA determines that the training is not for a specific application (step S104, no), the processing proceeds to step S105. Otherwise (step S104, yes), the processing proceeds to step S114.

In step S105, the STA determines whether the frame received in step S102 instructs beamforming training using receive beam training. If the frame instructs beamforming training using receive beam training (steps S105, yes), the processing returns to step S101. Otherwise (step S105, no), the processing proceeds to step S106 illustrated in FIG. 10.

In step S106 illustrated in FIG. 10, the STA performs transmit beam training of the AP that is the transmission source of the frame received in step S102. Thereafter, in step S107, the STA acquires Beacon information of the AP.

In step S108, the STA determines whether the AP that is the transmission source of the frame in step S102 is an AP that desires link setup. The determination can be made by, for example, referring to a list of APs that desire link setup acquired from the higher layer and Beacon information. If, in step S108, it is determined that the AP is an AP that desires link setup (yes in step S108), the processing proceeds to step S109. Otherwise (step S108, no), the processing returns to step S101.

In step S109, the STA transmits a response frame for the beamforming training by transmit beam training. This step corresponds to the "transmission" sequence of the terminal B (STA) illustrated in FIG. 4B.

In step S110, the STA performs transmit beam training for the STA and transmits the result of transmit beam training indicating the transmit beam that was received from the AP and that was optimal for the STA.

In step S111, the STA receives a response frame for beamforming training from the AP. Thereafter, in S112, the STA obtains the result of the transmit beam training (information regarding the transmit beam that was received from the STA and that was optimum for the AP) on the basis of the response frame for the beamforming training received from the AP in step S111.

Subsequently, in step S113, the STA further applies, to the receive beam, the transmission config (information regarding the beam optimum for transmission) based on the result obtained in step S112 and records the transmission config. As a result, during the time period required for transmit beam training, the STA can complete both transmit beamforming training and receive beamforming training without performing receive beam training. Thus, the time required for the beamforming training can be reduced.

In addition, in step S114 illustrated in FIG. 9, the STA determines whether the frame received in step S102 instructs beamforming training using receive beam training. If the frame instructs beamforming training using receive beam training (step S114, yes), the processing proceeds to step S115 illustrated in FIG. 10. Otherwise (step S114, no), the processing returns to step S101.

In addition, in step S115, the STA performs receive beam training and receives the result of receive beam training. In step S116, the STA further applies reception config (information regarding the optimum beam for reception) based on the result obtained in step S115 to the transmit beam and record the reception config. Thereafter, in step S117, the STA acquires the Beacon information of the AP.

In step S118, the STA determines whether the AP that is the transmission source of the frame is an AP that desires link setup in step S102. If it is determined that the AP is an AP that desires link set up (step S118, yes), the processing proceeds to step S119. Otherwise (step S118, no), the processing returns to step S101.

In step S119, the STA specifies receive beam training as beamforming training. Thereafter, in step S120, the STA transmits a response frame of the beamforming training by using the receive beam training.

According to the example of the operation performed by the STA illustrated in FIG. 9 and FIG. 10, upon receiving, from the AP, a beamforming training frame for high-speed communication, the STA stands by for receive beam training by using quasi-omni. In this manner, due to the reciprocity, the result of the receive beam training can be applied to the transmit beam. Thus, the need for the responding operation can be eliminated. As a result, the time required for the beamforming training can be reduced.

Figure 11:
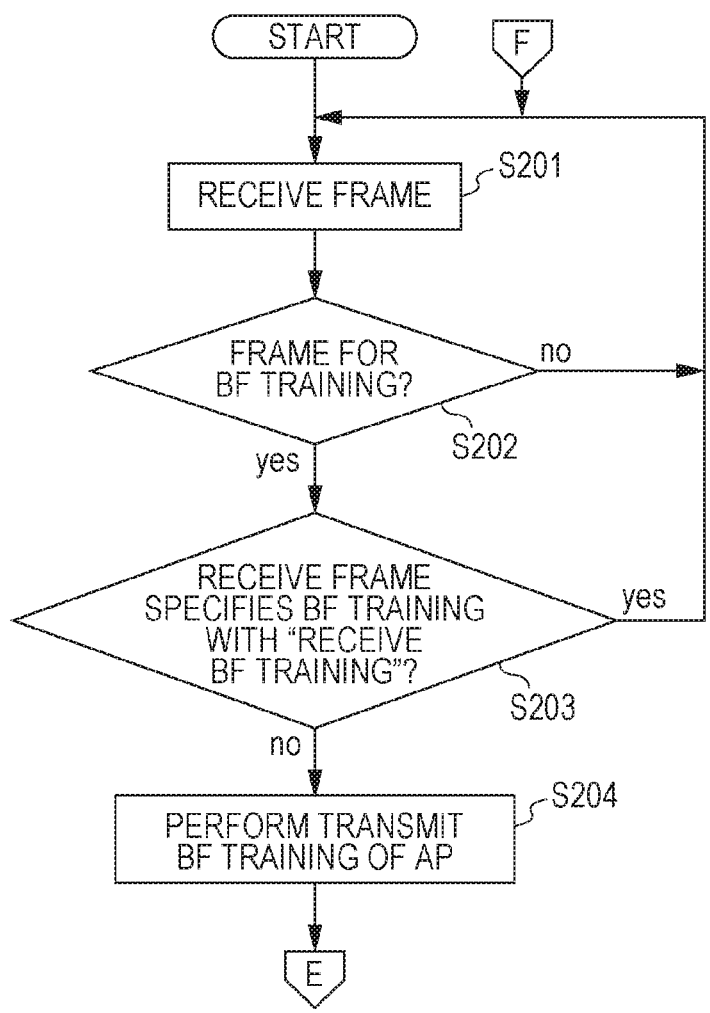
FIG. 11 is a flowchart illustrating an example of the operation performed at the STA side after the initial link setup with the AP is completed.
Figure 12:
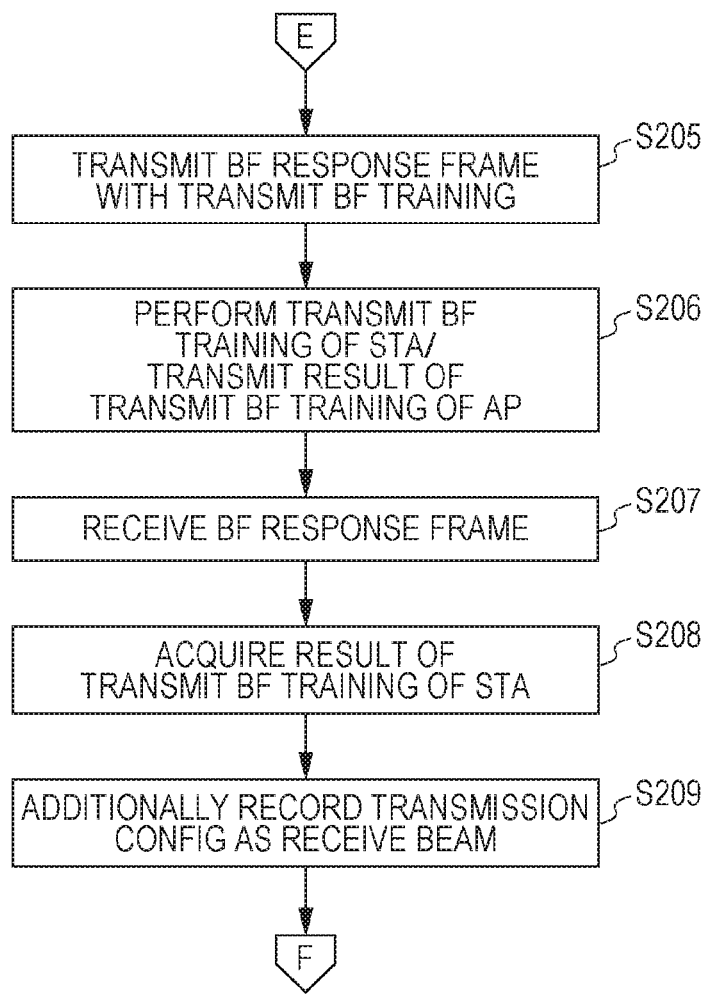
FIG. 12 is a flowchart illustrating an example of the operation performed at the STA side after the initial link setup with the AP is completed.

An example of the operation performed by the STA after the initial link setup is completed is described below. FIGS. 11 and 12 are flowcharts illustrating an example of the operation performed by the STA after the initial link setup with the AP is completed.

In step S201, the STA receives some frame from another wireless communication device (in the following description, an AP, for example). In step S202, the STA determines whether the frame received in step S102 is a frame for beamforming training. If the STA determines that the frame is a frame for beamforming training (step S202, yes), the processing proceeds to step S203. Otherwise (step S202, no), the processing returns to step S201.

In step S203, the STA determines whether the frame received in S201 instructs beamforming training using receive beam training. If the frame instructs beamforming training using receive beam training (step S203, yes), the processing returns to step S201. Otherwise (step S203, no), the processing proceeds to step S204.

In step S204, the STA performs transmit beam training of the AP that is the transmission source of the frame received in step S201.

Subsequently, in step S205 illustrated in FIG. 12, the STA transmits a response frame of the beamforming training by using transmit beam training. This step corresponds to the "transmission" sequence of the terminal B (STA) illustrated in FIG. 4B.

In step S206, the STA performs the transmit beam training in the STA and transmits the result of the transmit beam training which indicates the optimum transmit beam that is received from the AP and that is optimum for the STA.

In step S207, the STA receives, from the AP, a response frame for the beamforming training. Thereafter, in S208, the STA obtains the result of the transmit beam training (the transmit beam received from the STA and optimum for the AP) on the basis of the response frame for the beamforming training received from the AP in step S207.

Subsequently, in step S209, the STA also applies the transmission config (information regarding the beam optimum for transmission) based on the result obtained in step S208 to the receive beam and records the transmission config. As a result, the STA can complete both the transmit beamforming training and the receive beamforming training without performing the receive beam training during the time required for the transmit beam training. Thus, the time required for the beamforming training can be reduced.

According to the example of the operation performed by the STA illustrated in FIG. 11 and FIG. 12, if the frame for the beamforming training received after the initial link setup instructs "receive BF training" as the beamforming training, the beamforming training is highly likely to be beamforming training started by the AP for the STA that performs initial link setup using high-speed communication or USR. Thus, the processing returns to step S201 without performing BF training.

As a result, since there is no interference with the beamforming operation performed by the STA that attempts to newly connect to the AP (initial link setup), the time required for the beamforming training can be reduced even for a STA that subsequently performs the initial link setup.

Figure 13:
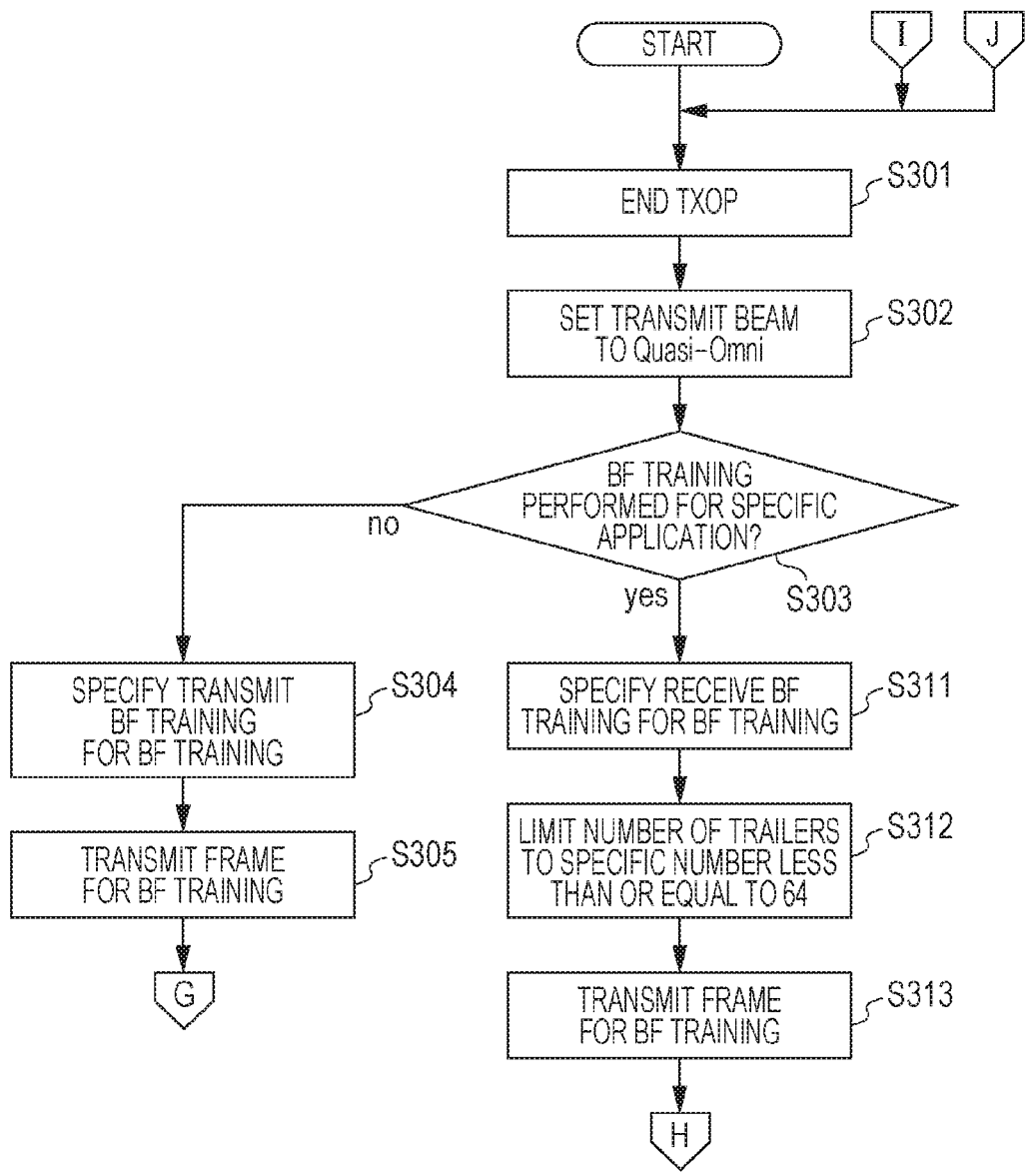
FIG. 13 is a flowchart illustrating an example of the operation performed at the AP side at the time of an initial link setup with the STA.
Figure 14:
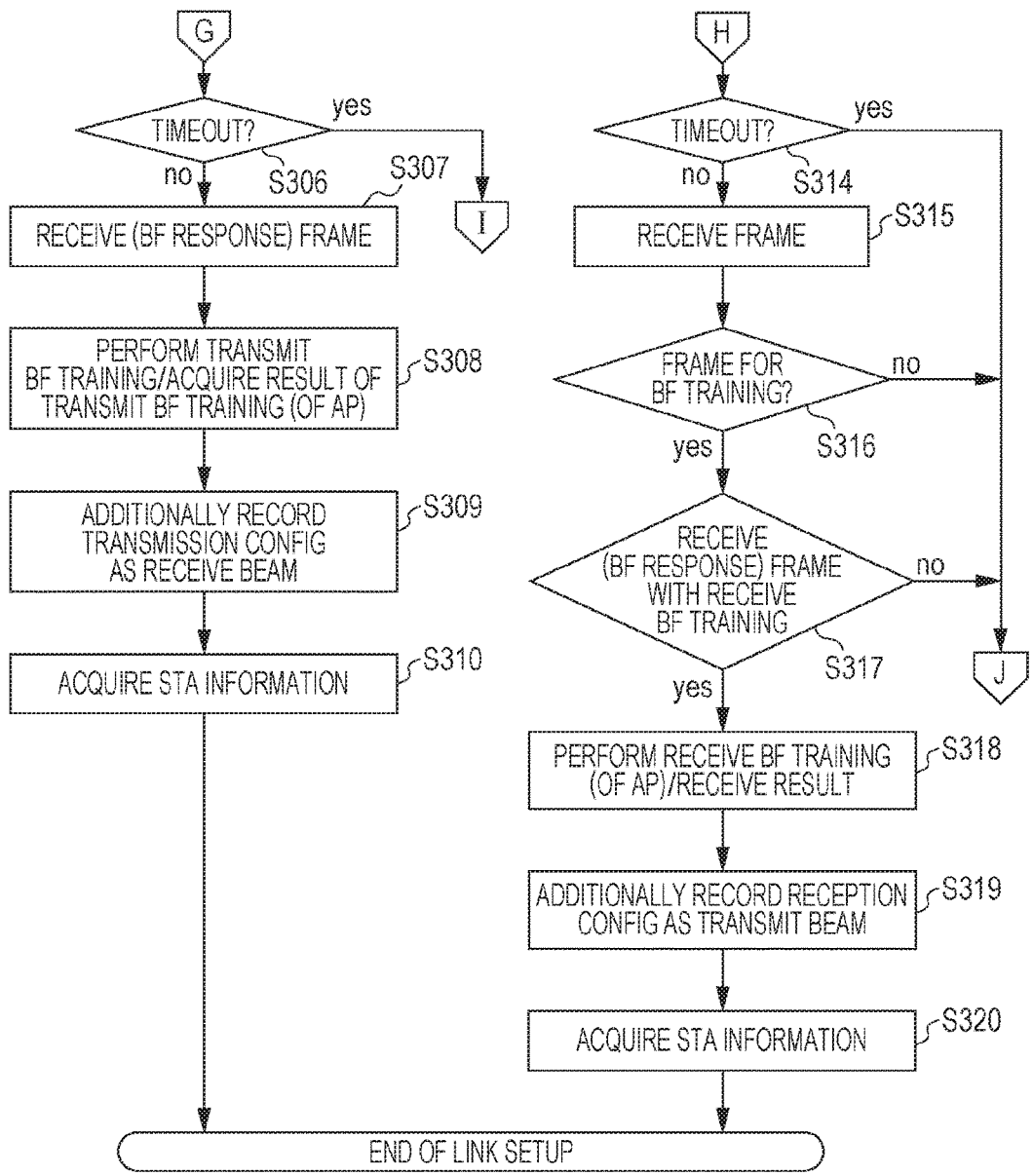
FIG. 14 is a flowchart illustrating an example of the operation performed at the AP side at the time of the initial link setup with the STA.

An example of the operation performed by the AP is described below. FIG. 13 and FIG. 14 are flowcharts illustrating an example of the operation performed by the AP that performs the initial link setup with the STA.

In step S301, the AP ends the TXOP period of the wireless communication device (the AP itself) or another wireless communication device that has been communicating with the wireless communication device itself. If communication has not been performed, the AP performs nothing. Thereafter, in step S302, the AP sets the transmit beam to quasi-omni. In step S303, the AP determines whether for example, beamforming training is performed for a specific application, (for example, for high speed communication or for USR (Ultra Short Range)). If the AP determines that the beamforming training is not performed for a specific application (step S303, no), the processing proceeds to step S304. Otherwise (step S303, yes), the processing proceeds to step S311.

In step S304, the AP specifies transmit beam training as beamforming training. Thereafter, in step S305, the AP transmits a frame for beamforming training to the STA, for example. Thereafter, in step S306 illustrated in FIG. 14, the AP determines whether a response to the frame for the transmit beam training transmitted in step S305 is sent back from the STA within a determined time period. If the response is received within a determined time period (step S306, no), the processing proceeds to step S307. Otherwise (step S306, yes), the processing returns to step S301.

In step S307, the AP receives a response frame for the beamforming training from the STA. Thereafter, in step S308, the AP performs transmit beam training and obtains the result of the transmit beam training (the transmit beam that is sent from the AP and that is optimum for the STA) on the basis of the response frame for the beamforming training sent from the STA and received in step S307.

Subsequently, in step S309, the AP also applies the transmission config based on the result obtained in step S308 (information regarding the optimum beam for transmission) to the receive beam and records the transmission config. Thereafter, in step S310, the AP acquires information about the STA.

However, referring back to FIG. 13, if it is determined that the beamforming training is the one for high-speed communication or USR, the AP specifies receive beam training as the beamforming training in step S311. In step S312, the number of trailers (refer to FIG. 2) added to the frame for beamforming training is limited to 64 or less. Thereafter, in step S313, the AP transmits a frame for beamforming training to the STA by using MCS 0.

Note that the reason for limiting the number of trailers is as follows. That is, it is difficult for the STA to know the effective number of beams of the AP beforehand. Accordingly, by limiting the number of beams by the AP beforehand, pressure on the effective bandwidth due to an increase in the frame length is prevented.

In step S314 illustrated in FIG. 14, the AP determines whether some frame has been received from the STA within a determined time period. If some frame has been received (step S314, no), the processing proceeds to step S315. Otherwise (step S314, yes), the processing returns to step S301.

In step S315, the AP receives some frame from the STA. Thereafter, in step S316, the AP determines whether the frame received in step S315 is a frame for beamforming training. If, as a result of the determination, the frame is a frame for beamforming training (step S316, yes), the processing proceeds to step S317. Otherwise (step S316, no), the processing returns to step S301.

In step S317, the AP determines whether the response frame of the received beamforming training has been received by the receive beam training. If the response frame of the received beamforming training has been received by the receive beam training receiving (step S317, yes), the processing proceeds to step S318. Otherwise (step S317, no), the processing returns to step S301.

In step S318, the AP performs receive beam training and receives the result of the receive beam training.

Subsequently, in step S319, the AP also applies, to the transmit beam, the reception config (information regarding the beam optimum for reception) based on the result obtained in step S318 and recorded the reception config. The AP can eliminate the need for transmit beam training and can complete both transmit beamforming training and receive beamforming training during the time required for receive beam training. Thus, the AP can reduce the time required for beamforming training. Thereafter, in step S320, the AP obtains information regarding the STA.

According to the example of the operation performed by the AP illustrated in FIG. 13 and FIG. 14, in the case of beamforming training for high-speed communication, the AP starts transmit beam training with quasi-omni. If the frame received from the STA within a determined time period is a frame for beamforming training, the AP performs receive beam training. As a result, the connection destination which is an STA for low-speed communication can be excluded in advance.

As described above, the base station device (the AP) according to the present disclosure is a base station device that performs wireless communication with a wireless terminal device in accordance with IEEE802.11 and omnidirectionally transmits, to the wireless terminal device, a frame for beamforming training at the lowest MOS rate defined in IEEE802.11. After a determined period since transmission of the frame for the beamforming training, the base station device performs receive beam training for a response frame from the wireless terminal device.

In addition, the wireless terminal device (the STA) according to the present disclosure is a wireless terminal device that performs wireless communication with the base station device in accordance with IEEE 802.11. The wireless terminal device omnidirectionally receives, from the base station device, a frame for beamforming training and performs receive beam training on the frame for beamforming training. In a case where the wireless terminal device directionally receives the frame for beamforming training, the wireless terminal device omnidirectionally transmits, to the base station device, a response frame at the lowest MOS rate defined in IEEE802.11.

In addition, the wireless communication method according to the present disclosure is a wireless communication method for use of a wireless communication system including a wireless terminal device and a base station device that perform wireless communication compliant with IEEE 802.11. The method includes omnidirectionally transmitting a frame for beamforming training from the base station device to the wireless terminal device at the lowest MOS rate defined in IEEE 802.11, omnidirectionally receiving the frame for beamforming training by the wireless terminal device, performing receive beam training on the frame for beamforming training, omnidirectionally transmitting a response frame to the base station device at the lowest MCS rate defined in IEEE 802.11 in a case where the frame for beamforming training is directionally received by the wireless terminal device, and performing receive beam training on the response frame after a determined period since transmission of the frame for beamforming training.

According to the present disclosure, by employing the above-described configuration, the STA can avoid connection with an AP for low-speed communication. In addition, in the beamforming training, the result of the receive beam training can be further applied to a transmit beam due to the reciprocity. Thus, the need for the responding operation can be eliminated. As a result, the time required for beamforming training can be reduced.

Note that in general, APs have higher design flexibility of the housing than STAs. In addition, APs have a larger power and a larger cooling performance than STAB. Since the AP has high design flexibility, a larger number of antenna elements can be easily disposed in the AP than in the STA. In addition, since the AP has a larger power available, the AP more easily obtains a narrowed beam and more easily increases the transmission output level than the STA. That is, the directional (beamed) and high-rate beam (the MCS-1 rate or higher) from the AP travels farther than the quasi-omni and MCS-0 beam from the STA. Therefore, if beamforming training is performed using a beamed and high-rate beam transmitted from the AP, it is difficult to exclude the possibility that the STA that succeeded in link setup may have no high transmission capability (the STA may be an STA for low speed communication).

According to the present disclosure, beamforming training is performed using quasi-omni, so that the beam transmitted from the AP does not reach too far. In this manner, connection destinations which are low-rate communication STAs can be excluded from communication performed after completion of link setup.

Furthermore, in the wireless communication system according to the present embodiment, the beamforming training is started with the receive training of the STA and the reception sweep is performed. As a result, as illustrated in FIG. 2, the effort for a response operation can be eliminated and, thus, the time required for beamforming training can be reduced.

In addition, in the wireless communication system according to the present embodiment, the AP fixes the number of beams for sweeping to a specific value of 64 or less in receive beam training. In general, it is difficult to know in advance the effective number of beams of the AP that initiates receive training (STA). However, according to the present embodiment, by limiting the number of beams in advance by the AP, pressure on the effective bandwidth caused by an increase in the frame length can be prevented.

In addition, in the wireless communication system according to the present embodiment, transmit and receive beams have the reciprocity. The result of receive training is reflected on the transmit beam, and a frame for beamforming training in the opposite direction is transmitted. In this manner, the result of the receive training can be immediately reflected on transmission. As a result, the time required for the beamforming training can be reduced.

In addition, in the wireless communication system according to the present embodiment, the beam training frame transmitted by the AP is transmitted at the end of the TXOP (Transmission OPportunity) or immediately after the TXOP. In this manner, the time required for the initial link setup including the scanning operation (the operation to search for a connection destination) can be reduced.

Furthermore, in the wireless communication system according to the present embodiment, the beam training frame transmitted by the AP includes information regarding the AP (Beacon information). As a result, the time required for the initial link setup including the scanning operation (the operation to search for a connection destination) can be reduced.

Note that in the wireless communication system according to the present embodiment, sweeping of the receive beam in the beamforming training may be performed by individual PPDUs (PLOP Protocol Data Units). Thus, the overhead of the MAC frame (MPDU: MAC (Medium Access Control) protocol data unit) can be eliminated. As a result, the time required for beamforming training can be reduced.

Furthermore, in the wireless communication system according to the present embodiment, the beamforming training is performed by using, as a trailer field used for receive beam sweep, a frame (PPDU) disposed after MPDU (a frame following MPDU) instead of using individual PPDUs. In this manner, the overhead of the MAC frame (MPDU) can be eliminated. As a result, the time required for beamforming training can be reduced.

Note that the present disclosure is not limited to the wireless communication system described in the above embodiment. For example, the following modifications can be made.

As described above, it is difficult for the STA that has received the beamforming training frame to determine whether the received frame is transmitted from the AP with a narrowed beam (beamed) or transmitted with a beam that is not narrowed down (quasi-omni). According to the present disclosure, to determine which one of the beams is used, for example, a field indicating that transmission is performed without narrowing down the beam may be added to the beamforming training frame transmitted by the AP, and the frame may be transmitted. For example, the added field may be added to, for example, the MAC frame portion of, for example, the beamforming training frame.

In this way, in the case of desiring high-speed communication, the STA can determine whether to respond to a beamforming training request by referring to the information in the added field and, thus, unnecessary training and unnecessary link setup procedure can be eliminated.

In addition, the field added to the frame for beamforming training transmitted by the AP may be a field indicating that for example, transmission is performed with quasi-omni or a field indicating the wireless capability of the AP, such as the transmission power (EIRP) or the half maximum full-width, in the form of a numerical value. By adding such a field, the same effect as the effect of the above-described added field can be obtained.

Furthermore, the field added to the frame for beamforming training transmitted by the AP may be a field indicating that the beam forming intended by this frame is limited to specific usage, such as communication using high-speed MCS or USR (Ultra Short Range) communication. By adding such a field, the AP can give, to a necessary terminal (a terminal suitable for high-speed communication, for example), the chance for link setup. Furthermore, the STA which has already established the connection and is performing communication need not easily respond to a beamforming training request and does not deprive a terminal that newly attempts to connect to the STA of a chance to perform beam forming.

In the above-described embodiment, the beam having no directivity or small directivity is referred to as quasi-omni. However, the present disclosure is not limited thereto. For example, a pseudo-omnidirectional beam (pseudo-omni) or omnidirectional beam (omni) may be employed.

The present disclosure is applicable to a base station device, a wireless terminal device, and a wireless communication method for performing wireless communication compliant with IEEE 802.11.

What is claimed is:

1. A base station device comprising:
frame generation circuitry that generates a first training frame used for receive beam training among frames used for beamforming training and generates at least one trailer as a second training frame, the receive beam training being beam refinement protocol (BRP);
beam controlling circuitry that sets a beam used to transmit the first training frame to an omnidirectional beam;
transmission circuitry that transmits the first training frame at the lowest Modulation and Coding Scheme (MCS) rate defined in IEEE 802.11 and omnidirectionally transmits the second training frame after omnidirectionally transmitting the first training frame;
reception circuitry that receives a first response frame and a second response frame from a wireless terminal device that has received the first training frame after a determined period since transmission of the first training frame; and
frame determination circuitry that determines whether the received first response frame is a response to the receive beam training,
wherein in a case where the received first response frame is a response to the receive beam training, the beam controlling circuitry sets a beam received by the receiver to a directional beam, and the reception circuitry receives the second response frame by using the directional beam.

2. The base station device according to claim 1, comprising:
determination circuitry that determines a receive beam property indicated by the second response frame received by the receiver using the directional beam,
wherein the beam controlling circuitry records a result of determination made by the determination circuitry as a transmit beam property of the base station device.

3. A wireless terminal device comprising:
reception circuitry that receives, from a base station device, a first training frame used for beamforming training by using an omnidirectional beam and, receives at least one second training frame used for beamforming training;
frame determination circuitry that determines whether the first training frame instructs receive beam training;
beam controlling circuitry that changes a beam property of the reception circuitry to a directional beam in a case where the first training frame instructs the receive beam training;
determination circuitry that determines a receive beam property indicated by the at least one second training frame received by the reception circuitry using the directional beam;
frame generation circuitry that generates a first response frame including a result of determination made by the determination circuitry; and
transmission circuitry that omnidirectionally transmits the first response frame at the lowest Modulation and Coding Scheme (MCS) rate defined in IEEE 802.11.

4. The wireless terminal device according to claim 3, wherein the beam controlling circuitry records the result of determination made by the determination circuitry as a transmit beam property of the wireless terminal device.

5. The wireless terminal device according to claim 3, wherein the frame generation circuitry generates at least one second response frame used for the receive beam training using beam refinement protocol (BRP) in the base station device, and
wherein the transmission circuitry omnidirectionally transmits the first response frame and, omnidirectionally transmits the at least one second response frame.

6. A wireless communication method for use of a wireless terminal device and a base station device that perform wireless communication compliant with IEEE 802.11, the method comprising
generating a first training frame and at least one second training frame used for receive beam training among frames used for beamforming training for the wireless terminal device by using the base station device;
setting a beam used to transmit the first training frame and the at least one second training frame to an omnidirectional beam;
transmitting the first training frame and the at least one second training frame at the lowest Modulation and Coding Scheme (MCS) rate defined in IEEE 802.11 by using the base station device;
receiving the first training frame used for the beamforming training by the wireless terminal device using the omnidirectional beam;
determining whether the first training frame instructs receive beam training by using the wireless terminal device;
changing a receive beam property to a directional beam in a case where a first response frame instructs receive beam training;
receiving the at least one second training frame by using the directional beam by using the wireless terminal device;
determining a receive beam property of the wireless terminal device by using the at least one received second training frame;
generating the first response frame including the receive beam property of the wireless terminal device by using the wireless terminal device;

omnidirectionally transmitting the first response frame at the lowest MCS rate defined in IEEE 802.11 by using the wireless terminal device;

receiving the first response frame and at least one second response frame from the wireless terminal device by using the base station device after a determined period since transmission of the first training frame from the base station device;

determining whether the received first response frame is a response to the receive beam training by using the base station device;

setting the receive beam of the base station device to the directional beam in a case where the received first response frame is a response to the receive beam training; and receiving the at least one second response frame by using the base station device using the directional beam.

* * * * *